S. G. GOSS.
AUTOMATIC STEREOTYPE PLATE FINISHING MACHINE.
APPLICATION FILED SEPT. 24, 1909.

1,230,577.

Patented June 19, 1917.
5 SHEETS—SHEET 1.

Fig. 1.

Witnesses:
Inventor:
Samuel G. Goss

S. G. GOSS.
AUTOMATIC STEREOTYPE PLATE FINISHING MACHINE.
APPLICATION FILED SEPT. 24, 1909.

1,230,577.

Patented June 19, 1917.
5 SHEETS—SHEET 4.

S. G. GOSS.
AUTOMATIC STEREOTYPE PLATE FINISHING MACHINE.
APPLICATION FILED SEPT. 24, 1909.

1,230,577.

Patented June 19, 1917.
5 SHEETS—SHEET 5.

Witnesses:

Inventor:
Samuel G. Goss

UNITED STATES PATENT OFFICE.

SAMUEL G. GOSS, OF GLENCOE, ILLINOIS, ASSIGNOR TO THE GOSS PRINTING PRESS COMPANY, OF CHICAGO, ILLINOIS, A CORPORATION OF ILLINOIS.

AUTOMATIC STEREOTYPE-PLATE-FINISHING MACHINE.

1,230,577.   Specification of Letters Patent.   Patented June 19, 1917.

Application filed September 24, 1909. Serial No. 519,387.

*To all whom it may concern:*

Be it known that I, SAMUEL G. GOSS, of Glencoe, in the county of Cook, State of Illinois, have invented certain new and useful Improvements in Automatic Stereotype-Plate-Finishing Machines, of which the following is a specification, reference being had to the accompanying drawings.

My invention relates to plate finishing machines, and its object is to provide a new and improved mechanism that will work automatically to draw a stereotype plate into the machine, thereupon automatically stop the means by which the plate is forwarded into position, to provide means for setting the machine in operation to cut the tail from the plate and to shave and trim the plate, to automatically stop the plate shaving trimming and tail-cutting operation when completed, and to automatically set in motion the forwarding mechanism to eject the plate from the machine. My invention has for its further object the improvement of automatic machines for cutting the tails from, shaving and trimming stereotype plates in sundry details hereinafter pointed out. The mechanism shown in the accompanying drawings and described in the following specification also contemplates the automatic cooling of the plate during the cutting operation, but these features by themselves are made the subject of a separate application heretofore filed by me on the 14th day of June, 1909, Serial No. 502,132. The latter features of this invention, therefore, will be described only in so far as may be necessary for the explanation of the mechanism shown and described.

Referring to the drawings:—10 indicates the frame of the machine on which the various parts are mounted and which may be of any suitable character. 11 indicates bearing rings which are mounted upon the frame 10 and are preferably formed in two parts, $11^a$ and $11^b$, the part $11^a$ being bolted or otherwise secured to the framework and the other part $11^b$ being bolted or otherwise secured to the part $11^a$, the two, when placed together, forming bearing rings in which is mounted a drum 12. The drum 12 is an open-ended cylinder which is revolubly mounted in the bearing rings 11 and is cut away longitudinally for a portion of its periphery to form an opening 13, best shown in Fig. 2.

Figure 4:
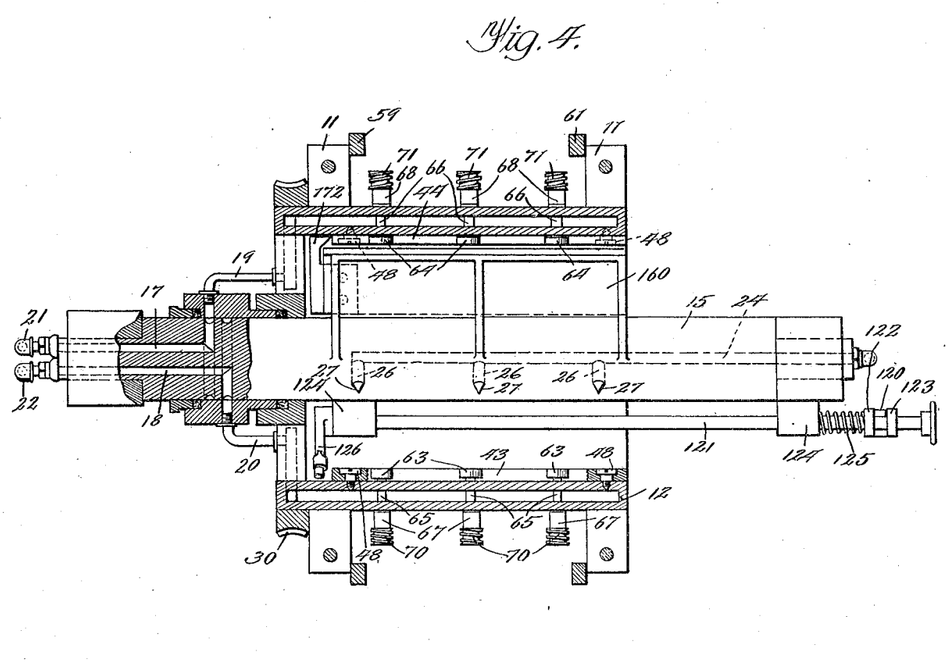
Fig. 4 is a horizontal section on line 4—4 of Fig. 1.

The drum is also provided with a number of cored-out openings 14, which are connected together to permit a flow of cooling fluid through the drum when admitted thereto as hereinafter described. 15 indicates a fixed shaft which is supported upon suitable brackets, as 16, in the framework concentric with the rings 11 and drum 12. The shaft is provided at one end with suitable passageways, as 17—18, which, by suitable tubing, as by 19—20, open into the passages 14 in the drum. The openings 17—18 are suitably connected by means of pipes as 21—22, to a suitable receptacle for cooling fluid, as 23, from which cooling fluid may be forced through the drum to cool the plate during the cutting operations. The other end of the shaft 15 is provided with another central longitudinal opening, as 24, which, by means of a suitable pipe, as 25, is also connected with the cooling fluid receptacle 23. The opening 24 by means of suitable transverse openings 26 (see Figs. 2 and 4), opens to the surface of the shaft 15, and each of the openings 26 is provided with spraying nozzles, as 27, best shown in Figs. 2 and 4, by means of which the interior surface of the plate may be sprayed with the cooling fluid. As these cooling features are made the subject-matter of my previous application above-mentioned, and form, taken by themselves, no part of my present invention, it is believed that no further description is necessary here.

Figure 1:
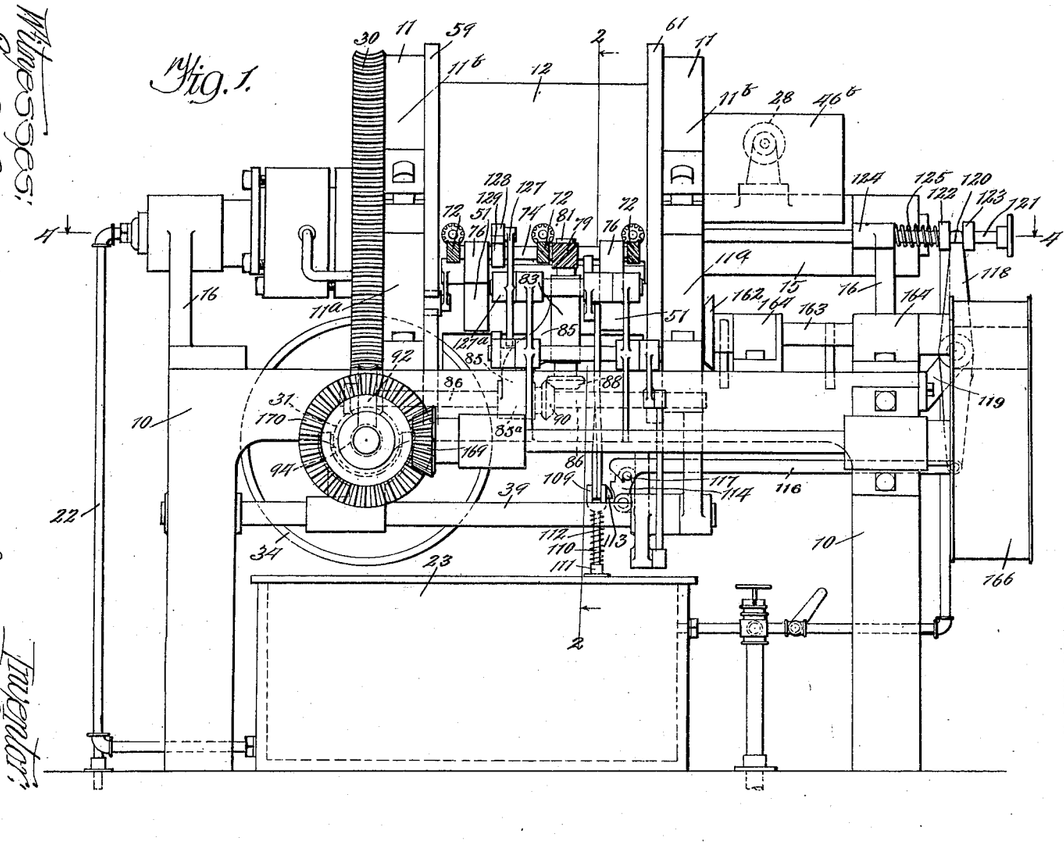
Figure 1 is a side elevation, the tail-piece support being omitted for the sake of clearness of the drawings.

28 indicates a roller journaled in a suitable bracket 29 on the fixed shaft 15, the said roller being adapted to support the plate when it is being introduced into the right-hand end of the machine, as shown in Fig. 1. 30 indicates a gear secured to one end of the drum 12 outside of the ring 11 toward the left-hand end of the machine, which gear meshes with a worm 31 which is formed upon a sleeve 32 rotatably mounted upon the drive shaft 33, the drive shaft being driven in any suitable manner, as by pulley 34 connected with any suitable source of power.

The sleeve 32 is provided at one end with a clutch member 35. 36 indicates a sleeve which is feathered upon the shaft 33 and is provided with a clutch 37 adapted to engage the clutch 35. The sleeve 36 is slid back and forth upon the shaft by suitable shifting arms 38 mounted on the rock-shaft 39 and operated by the hand-lever 40 secured to said rock-shaft. 41 indicates a strong retraction spring, one end of which is secured to a suitable bracket 42 carried by the framework and the other to the lever 40 near its outer end, and it operates to normally yieldingly hold the lever 40 in the position shown in Fig. 3 and to return it to said position when free to act after the lever has been moved.

Figure 5:
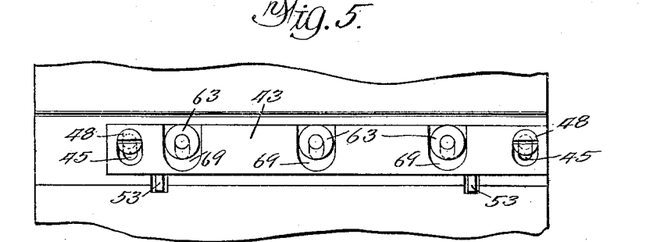
Fig. 5 is an enlarged detail, being a view of the movable supporting bars which lift to lock the plate in position.
Figures 6, 7, 8, 9:
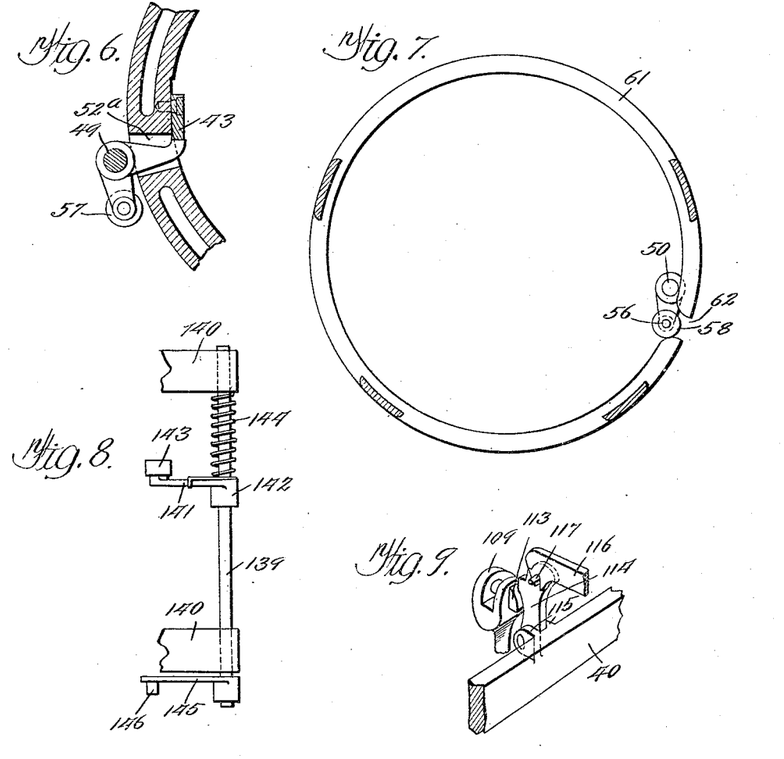
Fig. 6 is an enlarged detail, showing a portion of one side of the plate-carrying drum in section to show the arms by which the plate-lifting and locking devices are operated.
Fig. 7 is a detail, being a view of one of the cam rings for operating certain of the parts hereinafter described.
Fig. 8 is a detail, being a plan view of a shaft upon one side of the cylinder and its lever shown upon the right-hand side of Fig. 2.
Fig. 9 is a detail, being a view of the stop dog mechanism on the starting lever acting to operate certain shifting mechanism hereinafter described.

43—44 indicate supporting bars, which, by means of suitable slots 45 (see Fig. 5), are secured opposite one another upon the inside of the drum 12 to receive the edges of the curved stereotype plate 46 and support the same. The bars 43—44 are secured to the inside of the drum by nuts 48 so as to have a limited vertical movement in said drum, as is best shown in Figs. 5 and 6.

49—50 indicate rock-shafts which are mounted respectively in suitable brackets 51—52 secured upon the periphery of the drum. 53—54 indicate arms which are secured to the rock-shafts 49—50 and project inwardly through suitable slots, as 52ª (see Fig. 6), through the periphery of the drum 12, and whose inner ends bear upon the under side of the supporting bars 43—44.

Figure 2:
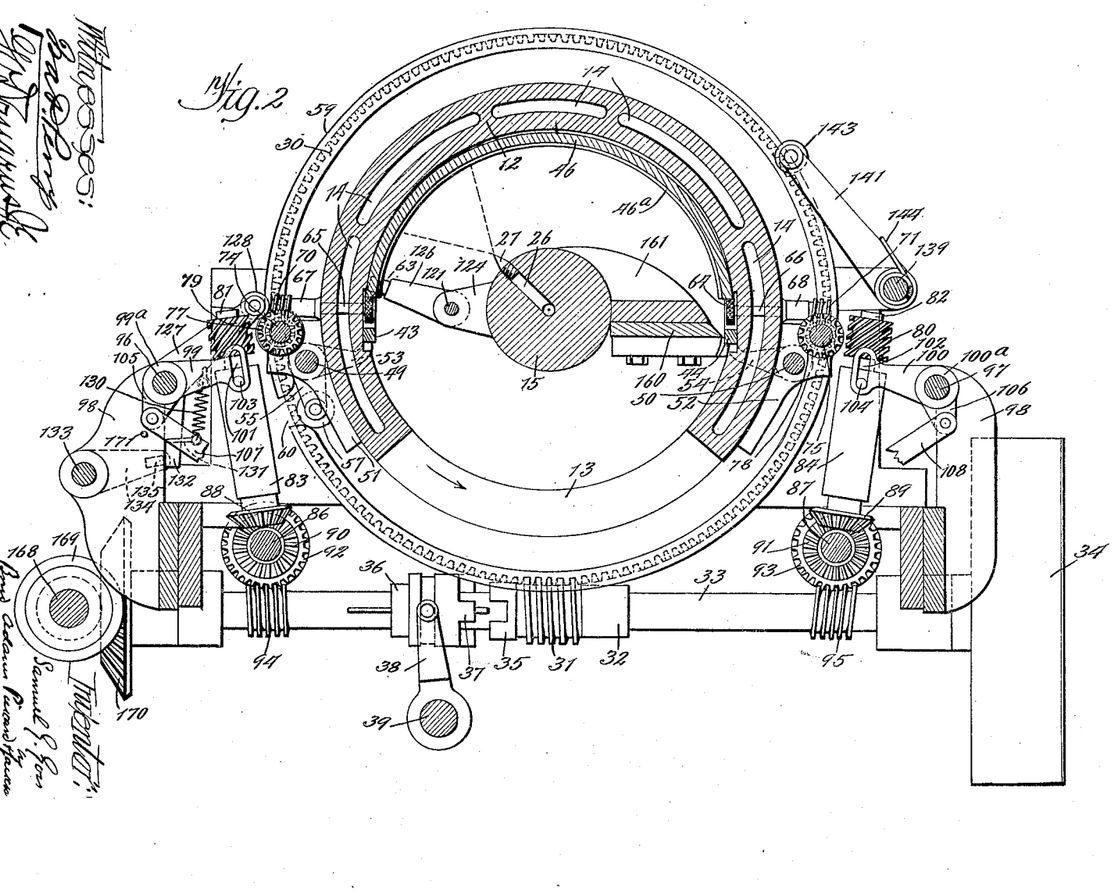
Fig. 2 is a section on line 2—2 of Fig. 1.

55—56 (see Figs. 3, 5 and 6) indicate arms which are secured respectively to rock-shafts 49 and 50, and carry upon their outer ends rollers 57—58. 59 indicates a ring which is secured to the framework of the machine, preferably supported upon one of the circles 11, and which is provided with an opening 60 (see Fig. 2). The ends of the ring 59 bounding the opening are curved to form a cam operating upon the roller 57. All the rest of the interior periphery of the ring is circular, and the roller 57 rides around it as the drum is rotated. 61 indicates a corresponding cam ring mounted similarly in the frame of the machine,—preferably on the other ring 11,—having an opening 62. The cam ring 61 with its opening 62 is similar in all respects to the ring 59 above described, except that the opening is upon the other side of the machine from the opening 60 in cam ring 59 and is adapted to act upon the roller 58 upon the arm 56.

In Fig. 2, the supporting bars 43—44 are shown in their lowest positions, the weight of the supporting bars 43—44 upon the arms 53—54 forcing them down, with the rollers 57—58 forced thereby into the openings 60—62. As soon as the drum 12 begins to rotate by the engagement of the clutch members above described, in the direction indicated by the arrow in Fig. 2, the rollers 57—58 will be moved inward by the operation of the cam ends of the respective rings, rocking the rock-shafts 49—50, moving the arms 53—54 upward and consequently the supporting bars 43—44 so as to lift the plate and hold its outer periphery firmly against the inner periphery of the drum 12. When the drum has completed one revolution and the rollers come opposite the openings 60—62, the weight of the plate will force the bars 43—44 downward, the rollers being free to move into the openings, and the plate will be freed from tight contact with the drum.

63—64 indicate rollers which are mounted respectively upon shafts 65—66 which are journaled in the drum and in suitable bearings 67—68 carried on the periphery of the drum. The rollers 63—64 lie within suitable recesses, as 69, in the supporting bars 43—44, the rollers projecting very slightly above the upper surface of the said bars 43—44 when the said bars are in their lower position. It will be obvious from the above description that when the said rollers are driven, as hereinafter described, and a plate is introduced into the machine from the right-hand end of Fig. 1, the rotation of the rollers will move the plate into the drum. The rollers are driven by means of worms 70—71 located respectively upon the outer ends of the shafts 65—66 and which mesh with worm-gears 72 on shafts 74—75 which are journaled in suitable bearings, as 76 (see Fig. 1) on the brackets 51—52 above described, the worm-gears 72 on the shaft 75 not being shown in the drawings. The shafts 74—75 are driven by worm-gears 77—78 secured to the said shafts and meshing respectively with worms 79—80 secured respectively upon shafts 81—82. The shafts 81—82 are journaled in suitable sleeves 83—84, respectively, which are secured to brackets 85. The brackets 85, are, by suitable bearings 85ᵃ at their lower ends, journaled on shafts 86—87 so as to permit a swinging of the brackets and sleeves about said shafts to a limited extent so as to swing the worms 79—80 into and out of engagement with the worm-gears 77—78. The lower ends of the shafts 81—82 are provided with bevel gears 88—89 which mesh, respectively, with bevel gears 90—91 on shafts 86—87. The shafts 86—87 are provided with worm-gears 92—93 secured thereto, which mesh respectively with worms 94—95 on the driving shaft 33. It will be obvious that when the driving shaft 33 is driven, through the several worm and bevel gears, the shafts 81—82 will be continuously rotated, continuously rotating the worms 79—80, and that when said worms 79—80 are swung toward the drum into engagement with worm-gears 72—73 the shafts 65—66 and rollers 63—64 will be driven so as to forward the plate as above described.

96—97 indicate shafts which are secured in suitable supports, as 98, on the framework of the machine. 99—100 indicate arms which are secured respectively to collars 99ᵃ—100ᵃ, which are journaled upon said shafts 96—97. The ends of the arms 99—100 are provided with slots 101—102 which engage respectively pins 103—104 on the sleeves 83—84. When the collars 99ᵃ—100ᵃ are rotated as hereinafter described in one direction or the other, the sleeves 83—84 will be swung about their journals toward or away from the drum so as to bring the worms 79—80 into or out of engagement with the worm-gears 77—78.

Figure 3:
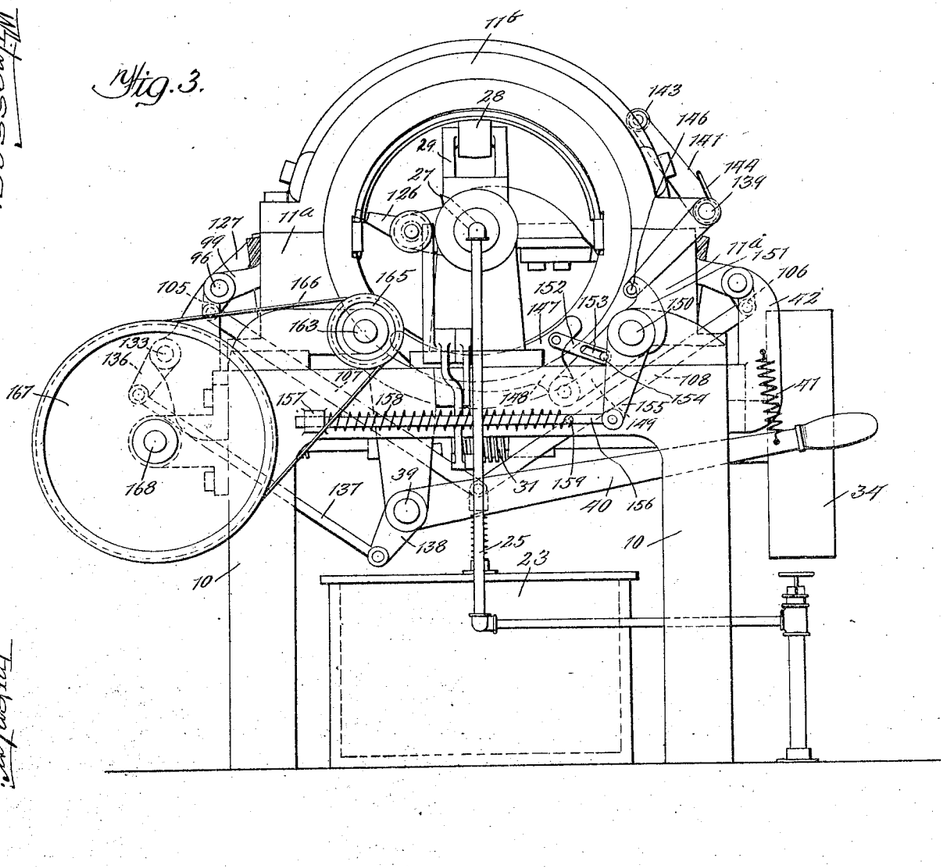
Fig. 3 is an end view of the mechanism seen from the right in Fig. 1.

105—106 indicate arms which are secured respectively to collars 99ᵃ—100ᵃ, as best shown in Figs. 2 and 3. 107—108 indicate links whose upper and outer ends are pivotally connected respectively with the arms 105—106 and which, projecting inward and downward below the center of the machine, are pivotally connected at their lower ends with a fork 109 on the upper end of a slide-rod 110 which is slidingly mounted in a suitable support, as 111, in the framework of the machine and is surrounded by a retractile spring 112 which is adapted to normally pull the fork 109 downward into the position shown in Fig. 1 and to hold it there yieldingly. One side of the fork 109 has formed integral upon it a lug 113 whose side, as is best shown in Figs. 1 and 9, is cam-shaped and whose lower end is flat. 114 (best shown in Figs. 1 and 9) indicates a dog which is pivotally mounted between suitable ears 115 on the lever 40, and which is adapted to engage the lug 113. 116 indicates a link whose inner end, by means of a suitable slot or recess, engages a pin 117 on the swinging dog 114, and whose outer end is pivotally connected with a rock-lever 118 which is journaled in a suitable bracket 119 at one end of the frame of the machine. The upper end of the rock-lever 118 is provided with a fork 120 which straddles a slide-rod 121 between collars 122—123 secured to said slide-rod. The slide-rod 121 is slidingly mounted in suitable bearings, as 124, on the central shaft 15 and slides longitudinally of the machine in said bearings. 125 indicates a spiral compression and torsion spring which is mounted around the slide-rod 121 and has one end secured in the bracket 124 and the other end in the collar 122 secured to the rod 121. The spiral spring tends to yieldingly hold the slide-rod in the position shown in Fig. 1, and also when the slide-rod is rotated slightly in the manner hereinafter described tends to restore it to its normal position upon its being freed from the devices which tend to partially rotate it. The slide-rod 121 carries upon its inner end an arm 126 which projects outward to near the inner surface of the drum in position to be engaged by the forward edge of the plate when the plate is moved into the machine and has nearly reached its innermost or operative position, as is shown for instance in Fig. 2. When the plate is moved into the drum to nearly its proper position, its edge engages the end of the rod 126, and the further movement of the plate moves the rod 121 inward against the action of the spring 125. This movement is timed as hereinafter described.

127 indicates an arm which is secured to a collar 127ᵃ journaled on the shaft 96 and which projects upward therefrom and inward toward the drum and carries at its upper end a roller 128 which lies in the path of a roller 129 (see Fig. 1) on shaft 74. 130 indicates a spring, one end of which is secured to the arm 127 and the other end of which is secured by suitable means, as by a pin 131, to the bracket 98, the spring tending to pull the arm 127 down. When the drum rotates and has nearly made a complete rotation from the position shown in Fig. 2, the roller 129 will be brought into contact with the roller 128 and rock the arm 127 outward. 132 indicates an arm which projects downward from and is secured to the collar 127ᵃ, being of course rocked with the arm 127. 133 indicates a rock shaft provided with an inwardly-projecting arm 134 (see dotted lines in Fig. 2) having at its inner end a stop 135 which is adapted, when the shaft is rocked to throw the arm downward and the arm 132 is swung to the left in Fig. 2, to engage with the lower end of the arm 132. The rock-shaft 133 is provided with another rock-arm 136 (see Fig. 3) which, by means of a link 137, is connected with the rock-arm 138 on the shaft 39 which is rocked by the hand-lever 40.

139 (see Figs. 1 and 2 and detail Fig. 8) indicates a rock-shaft which is journaled in suitable brackets 140 secured to and projecting outward from the rings 11. 141 indicates an arm, which, by means of a collar 142, is secured to the rock-shaft 139, and carries at its outer end a roller 143 journaled thereon. 144 indicates a torsion spring which surrounds the rock-shaft 139 between the collar 142 and one of the brackets 140. One end of the said spring is secured in the bracket 140 and the other bears upon the end of the arm 141 so as to yieldingly hold it in the position shown in Figs. 1 and 2 and to return the rock-shaft 139 when it has been rotated. The roller 143 lies in the path of the roller 129 above described on shaft 74, whereby, when the drum is rotated into the position at which the said rollers engage each other the arm 141 will be rocked upward.

145 indicates an arm secured to the rock-shaft 139 and carrying a stud 146 at its outer end. 147 indicates a tail-piece support which is curved at its upper surface and is located centrally of the machine outside of the drum,—namely to the right in Fig. 1. By means of a lug 148 projecting downward from the under surface of the support 147, the tail-piece support is pivotally mounted upon an arm 149 which is secured to a rock-shaft 150 journaled in the framework of the machine. The rock-shaft 150 is also provided with a hooked arm 151 secured to it and adapted, when the parts are in the position shown in Fig. 3, to normally engage the stud 146 on the arm 145. 152 indicates a link provided with a slot 153 and pivotally connected at one end with the support 147. The slot 153 engages a pin 154 on the rock-arm 149. 155 indicates a rock-arm on the rock-shaft 150, whose lower end is pivotally connected with a rod 156 whose other end is slidingly mounted in a suitable apertured lug 157 on the framework of the machine. 158 indicates a spiral spring one end of which is secured to the lug 157 and the other end of which is secured to a pin 159, on the rod 156. The spring is a retractile spring and tends to yieldingly hold the parts in the position shown in Fig. 3. When the arm 141 is rocked outward, the arm 145 will be rocked upward, freeing the pin 146 from the hooked arm 151 and leaving the said hook free to rock inward and the support 147 to be depressed by the weight of the severed tail lying upon it, as hereinafter described.

As has been said, 46 indicates the curved stereotype plate, provided with ribs 46ª and cast with the usual tail-piece 46ᵇ. 160 indicates a shaving knife which is adjustably mounted in any well-known manner upon a bracket 161 projecting from the fixed central shaft 15, and adapted, when the drum is rotated with the plate, to shave the inner surface of the plate or the ribs 46ª. 162 indicates a rotary trimming knife secured upon the end of a shaft 163 journaled in suitable bearings, as 164, on the frame, and driven by a pulley 165, belt 166, and pulley 167. The pulley 167 is secured to a shaft 168 journaled in suitable bearings in the frame and provided at one end with a bevel gear 169 which meshes with a bevel gear 170 on the drive shaft 33.

171 indicates a stop which is secured on one of the brackets 98 in the path of the bar 132 to limit its movement when thrown backward by the operation of the spring 130 on the arm 127.

172 (see Fig. 4) indicates an edge-trimming knife which is suitably rigidly mounted on the central shaft 15 and which is so located as to engage the inner edge of the plate when the drum is rotated and to trim and bevel the inner edge corresponding with the bevel cut upon the outer edge by the tail-cutting knife 162.

The operation of the mechanisms above described is as follows:—The several figures show the machine with the plate in position in the drum and the drum ready to be set in rotation. The lever 40 is in its upper position; the clutches 35 and 37 are disengaged; the plate, pushed inward, has moved the slide-rod 121 to its inner position in the manner above described, which has moved the upper arm of the lever 118 inward, the lower arm outward, and, by means of the link 116, has rocked the swinging dog 114 out of engagement with the under side of the latch dog 113 on the fork-head 109, leaving it free to move downward. The spring 110 has retracted or drawn the fork-head 109 downward, being freed to act by the disengagement of the dog above described, which has, through the links 107—108, rocked the arms 99—100 upward and rocked back the sleeves 83—84, swinging the worms 78—80 out of engagement with their respective worm-gears, thus silencing the rollers 63—64 which have previously moved the plate inward in the manner hereinafter described.

The lug 135 on the arm 134 is resting against the outer face of the arm 132, preventing the action of the spring 130 and thus holding the arm 127 with the roller 128 in the position shown in Fig. 2. The rollers 57 and 58 are resting in the apertures in the cam-rings 59—61, being moved outward by the weight of the bars 43—44, leaving as is shown in Fig. 2 a space between the convex surface of the plate 46 and the inner surface of the drum. The cooling fluid is flowing through the drum, and being sprayed against the plate from the nozzles 27 to cool the plate. All the moving parts of the machine, therefore, except the shaft 33 and the rotary cutting knife 162, are silenced, the shaft 33 being driven continuously during the time of use of the machine.

The arm 141 is in the position shown in Fig. 2, with the hook 151 engaging the pin 146, holding the tail-support 147 in position to receive the tail-piece when severed, as hereinafter described.

The lever 40 is then depressed against the action of the spring 41, which is made considerably stronger than the spring 112. This movement of the lever 40 downward carries the swinging dog 114 downward with it, which dog, swinging backward against the spring 125 passes over the curved surface of the latch 113, and the dog, as soon as it passes below the latch, is swung by the spring 125 and the connecting parts,— namely by the pin 117 and link 116,—so that the dog 114 rests below the latch 113 ready to engage it upon the upward motion of the lever hereinafter described. This same movement of the lever 40, through the arm 138 and link 137, swings the arm 136 upward, the arm 134 downward, freeing the lug 135 from the arm 132, which thereupon is rocked outward against the stop 171 by the pull of the spring 130 upon the arm 127. This rocks the arm 127 downward and moves the roller 128 downward and inward ready to be engaged by the roller 129 as hereinafter described. The arm 132, swinging outward, lies in the path of the lug 135 on arm 134, preventing the return of the lever 40 by the spring 141 when the operator lets go his hold upon the lever, thereby locking it in its downward position until freed as hereinafter described.

The movement of the lever 40 also moves the clutch 37 into engagement with the clutch 35, rotating the sleeve 32 and the worm 31. This at once causes the drum to rotate slowly in the direction indicated by the arrow in Fig. 2. As soon as the drum begins to rotate, the rollers 57—58, engaging the curved ends of cam rings 59—61, respectively, are thrown inward, rocking the arms 55 and 56 inward, arms 53 and 54 upward, raising the bars 43 and 44, and thereby lifting the plate into close and tight contact with the interior surface of the drum, holding it there for one complete revolution while the rollers 57—58 are rolling on the circular portions of their respective cam rings 59—61.

As soon as the plate is rotated into proper position for engagement with the several knives, the knife 162 begins cutting the tail 46ᵇ, the knife 160 shaves the inner surface of the plate, and the knife 172 shaves and bevels the inner edge of the plate. As soon as the rear longitudinal edge of the plate passes beyond the end of the arm 126, which will be in about a half a revolution of the supporting drum, the arm 126 is of course freed from engagement with the forward edge of the plate, and the spring 125 forces the slide-rod 121 outward, moving the arm 126 back to its normal position.

As the revolution continues, the tail-piece is completely severed from the plate. The parts are so arranged that as soon as the tail-piece is completely severed, the roller 129, the drum having made somewhat more than a half a revolution,—in other words, enough to sever the tail-piece,—comes into contact with the roller 143, lifting it and the arm 141 upward, rocking the arm 145 upward, and freeing the pin 146 from the hooked arm 151. The weight of the severed tail thereupon falling upon the tail-support 147, forces it downward against the action of the spring 158, rocking the arms 149—155 to the right in Fig. 3, thus lowering the support sufficiently for the severed tail-piece to slide off the machine. As soon as this happens, the spring 158, pulling the rod 156 to the left in Fig. 3, rocks the arm 155 and thereby the rock-shaft 150 so as to swing the tail-support 147 back into its original position with the hook again in engagement with the pin 146, which, with the arm 145, has been returned to its original position by the spring 144, the roller 129 having passed out of engagement with the roller 143.

When the drum 12 has made one complete revolution, the tail-piece, as has been said above, has been cut, and the plate has been shaved and trimmed. At this time,— namely after one complete revolution,—the rollers 57—58 come opposite the spaces 60— 62 in cam rings 59—61, leaving them free to move outward. The weight of the plate thereupon depresses the bars 43—44, freeing the plate from tight engagement with the interior surface of the drum, and moving the rollers 57—58 into the positions shown in Figs. 2 and 7. Just before this has happened, the roller 129 by the rotation of the drum has engaged the roller 128, which has been moved into its path as above described, and, moving it outward, rocks the arm 127 outward and upward,—that is, to the left in Fig. 2, against the action of spring 130,— swinging the arm 132 to the right in Fig. 2 and freeing its lower end from the stop or lug 135 on the arm 134, thus leaving the arm 134 free to move and unlocking the lever 40. The spring 41 thereupon immediately retracts or lifts the lever to its original position, releasing the clutch 37 from engagement with the clutch 35. Inasmuch as the drum and plate 46 are comparatively light and the rotation is very slow, the momentum of the drum is almost negligible and the drum stops each time at approximately the same point. As the lever 40 moves upward, the swinging dog 114, engaging the lug 113 from below, lifts the fork 109 against the action of the spring 110. This lifts the inner ends of the links 107—108, rocking the arms 105—106 outward,—that is, respectively to the left and right in Fig. 3. This movement moves the arms 99 and 100 downward, swinging the sleeves 83 and 84 inward and bringing the worms 79—80 into engagement with worm-gears 77—78, thus rotating the shafts 74—75, the worm-gears 77—78 being adapted to contact the worms 79—80 at any point throughout their length in accordance with the position at which the drum stops. The rotation of the shafts 74—75, through the engagement of the worm-gears 72—73 with worms 70—71, rotates shafts 65—66 and with them rollers 63—64, moving the plate out of the machine.

The complete rotation of the drum above described, by reason of the retraction of the arm 126, which has been brought by the spring 125 within the space occupied subsequently by the plate at the close of its rotation with the support 12, has caused the leading longitudinal side of the plate in the rotation to engage the end of the arm, depressing it of course slightly against the action of the spring 125 on the slide-rod 121, thus permitting the forward movement of the plate out of the machine as hereinafter described.

The rollers 63—64 having been set into operation, they begin forwarding the freed plate out of the opposite end of the drum from that at which it entered, adapted to be carried away by hand or in any other suitable manner.

The machine is now in position for the reception of another plate, the slide bar 121 being in its outermost position and the arm 126 having been returned by the torsional action of the spring 125 into the path of the advance of the next plate. The swinging dog 114 is of course still in engagement with the under side of the latch 113, holding the fork 109 in its upper position against the action of the spring 112 and thus holding the swinging sleeves 83—84 in their inner position. The worms 79—80 are in engagement with their respective worm-gears, and the forwarding rollers 63—64 are being continuously driven, the bars 43—44 being depressed. The new plate, therefore, being raised upon the roller 28, is moved inward with its lower edges resting on the bars until they are engaged by the rollers 63—64, by the rotation of which the plate is automatically fed into the machine. The parts are so adjusted that as the plate nears its innermost position, it engages the arm 126 and moves it inward, moving thereby the slide-rod 121 inward. This movement of the slide-rod 121 against the action of the spring 125 rocks the lever 118 so as to draw the dog 114 out of engagement with the latch 113. This leaves the spring 112 free to act, which immediately draws the fork 109 and slide-rod 110 downward, pulling the ends of links 107—108 downward, rocking the arms 105—106 inward,—that is, respectively to the right and left in Fig. 3,—rocking the arms 99—100 upward, and swinging the sleeves 83—84 outward,—that is, respectively to the left and right in Fig. 2,—and freeing the worms 79—80 from their respective worm-gears, silencing thus the rotation of the shafts 74—75 and the consequent rotation of the rollers 63—64. The parts are then in the position shown in Fig. 2 and ready for the next downward movement of the lever 40.

What I claim as my invention and desire to secure by Letters Patent is:—

1. In combination, a rotatable support adapted to receive a stereotype plate therein, mechanism adapted to rotate said support, plate finishing mechanism adapted by the rotation of said support to finish said plate, rollers adapted by their rotation to forward a plate into position therein, means for normally driving said rollers, and means for locking said plate firmly against said support after being forwarded into position therein.

2. In combination, a rotatable support adapted to receive a stereotype plate therein, mechanism adapted to rotate said support, plate finishing mechanism adapted by the rotation of said support to finish said plate, rollers adapted by their rotation to forward a plate into position therein, means for normally driving said rollers, and automatically-operated means for locking said plate firmly against said support after being forwarded into position therein.

3. In combination, a rotatable support adapted to receive a stereotype plate therein, mechanism adapted to rotate said support, plate finishing mechanism adapted by the rotation of said support to finish said plate, rollers adapted by their rotation to forward a plate into position therein, means for normally driving said rollers, and means adapted to bear upon the edges of the plate to lift it out of contact with the rollers and to hold it firmly in position in said support.

4. In combination, a rotatable support adapted to receive a stereotype plate therein, mechanism adapted to rotate said support, plate finishing mechanism adapted by the rotation of said support to finish said plate, rollers adapted by their rotation to forward a plate into position therein, means for normally driving said rollers, supporting bars adapted to be moved after the plate is forwarded into position to hold the plate firmly in position in the support, and means for automatically giving such movement to said supporting bars.

5. In combination, a rotatable support adapted to receive a stereotype plate therein, mechanism adapted to rotate said support, plate finishing mechanism adapted by the rotation of said support to finish said plate, rollers adapted by their rotation to forward a plate into position therein, means for normally driving said rollers, supporting bars adapted to be moved after the plate is forwarded into position to hold the plate firmly in position in the support, levers bearing against said supporting bars and adapted to move the same, and means for automatically operating said levers.

6. In combination, a rotatable support adapted to receive a stereotype plate therein, mechanism adapted to rotate said support, plate finishing mechanism adapted by the rotation of said support to finish said plate, rollers adapted by rotation to forward a plate into position therein, means for normally driving said rollers, and means adapted to automatically lift said plate into firm engagement with said support at the commencement of the rotation of said support and to automatically lower said plate into position upon said rollers after a predetermined rotation.

7. In combination, a rotatable support adapted to receive a stereotype plate therein, mechanism adapted to rotate said support, plate finishing mechanism adapted by the rotation of said support to finish said plate, rollers adapted by their rotation to forward a plate into position therein, means for normally driving said rollers, supporting bars adapted to be moved after the plate is forwarded into position to hold the plate firmly in position in the support, levers bearing against said supporting bars and adapted to move the same, and cam rings bearing on said levers and adapted to move said plate into firm engagement with said support, to hold said plate in such position during one revolution of said support, and to thereupon permit said plate to be lowered out of engagement with said support.

8. In combination, a rotatable support adapted to receive a stereotype plate therein, mechanism adapted to rotate said support, plate finishing mechanism adapted by the rotation of said support to finish said plate, rollers adapted by their rotation to forward a plate into position therein, means for normally driving said rollers, and means actuated by the support-rotating means to stop said roller-rotating mechanism.

9. In combination, a rotatable support adapted to receive a stereotype plate therein, plate finishing mechanism adapted by the rotation of said support to finish said plate, a spring-actuated lever, means arranged to be brought into action by the movement of said lever against the action of said spring to rotate said support, a stop adapted to cause said lever to be held in operative position, and means actuated by the rotation of said support to displace said stop whereby said spring moves said lever and stops the rotation of said support.

10. In combination, a rotatable support adapted to receive a stereotype plate therein, plate finishing mechanism adapted by the rotation of said support to finish said plate, a spring-actuated lever, means arranged to be brought into action by the movement of said lever against the action of said spring to rotate said support, a stop adapted to cause said lever to be held in operative position, and means actuated by the rotation of said support to displace said stop whereby said spring moves said lever and stops the rotation of said support, said lever being movable to bring about the rotation of said support in the normal manner even while said stop is held temporarily displaced at the commencement of the rotation.

11. In combination, a rotatable support adapted to receive a stereotype plate therein, plate finishing mechanism adapted by the rotation of said support to finish said plate, a spring-actuated lever, means arranged to be brought into action by the movement of said lever against the action of said spring to rotate said support, a rock-shaft adapted to be rocked by said movement of said lever, an arm mounted on said rock-shaft, a pivotally-mounted arm adapted to engage the arm on said rock-shaft upon said movement of said lever to prevent the return of said rock-shaft to normal position, a second spring tending to move said pivotally-mounted arm in the direction to engage the arm on said rock-shaft, and means actuated by the rotation of said drum at a predetermined point in said rotation to move said pivotally-mounted arm against the action of said last-named spring out of engagement with the arm on said rock-shaft.

12. In combination, a rotatable support adapted to receive a stereotype plate therein, mechanism adapted to rotate said support, plate finishing mechanism adapted by the rotation of said support to finish said plate, rollers adapted by their rotation to forward a plate into position therein, means for normally driving said rollers, mechanism operated by the forward movement of said plate in said support to stop said roller-rotating mechanism during the rotation of said support, means for automatically stopping the rotation of said support after said plate is finished, and mechanism automatically operated to again rotate said forwarding rollers.

13. In combination, a rotatable support adapted to receive a stereotype plate therein, mechanism adapted to rotate said support, plate finishing mechanism adapted by the rotation of said support to finish said plate, rollers adapted by their rotation to forward a plate into position therein, means for normally driving said rollers, mechanism operated by the rotation of said support to stop said roller-rotating mechanism during the rotation of said support, means for automatically stopping the rotation of said support after said plate is finished, and mechanism operated by the stopping of the rotation of said support to again rotate said forwarding rollers.

14. In combination, a drive shaft, a rotatable support adapted to receive a stereotype plate therein, plate-finishing means adapted by the rotation of said support to engage the plate and finish the same, connections between said shaft and said support for rotating said support, means for throwing said rotating mechanism into engagement with said support, means for disengaging said support-rotating mechanism automatically upon the completion of the rotation of said support, forwarding rollers carried by said support and adapted when rotated to forward a stereotype plate into position in said support, movable supporting bars adapted to receive the side edges of the plate in said support, mechanism for lifting said bars to lock the plate in said support, mechanism connected with said bar-lifting mechanism and adapted by the movement of said support-rotating mechanism to lift said bars, mechanism adapted to normally drive said forwarding rollers, mechanism adapted by the rotation of said support to stop the drive of said forwarding rollers, and mechanism connected with said support driving mechanism and adapted upon the cessation of the rotation of said support to again set into operation said roller-driving mechanism.

15. In combination, a drive shaft, a rotatable support adapted to receive a stereotype plate therein, plate-finishing means adapted by the rotation of said support to engage the plate and finish the same, connections between said shaft and said support for rotating said support, means for throwing said rotating mechanism into engagement with said support, means for disengaging said support-rotating mechanism automatically upon the completion of the rotation of said support, forwarding rollers carried by said support and adapted when rotated to forward a stereotype plate into position in said support, movable supporting bars adapted to receive the side edges of the plate in said support, mechanism for lifting said bars to lock the plate in said support, mechanism connected with said bar-lifting mechanism and adapted by the movement of said support-rotating mechanism to lift said bars, mechanism adapted to normally drive said forwarding rollers, mechanism adapted by the rotation of said support to stop the drive of said forwarding rollers, mechanism adapted to release said plate lifting bars after said plate is finished, and mechanism connected with said support-driving mechanism and adapted upon the cesssation of the rotation of said support to again set into operation said roller-driving mechanism.

16. The combination of a drive shaft, an open-ended drum adapted to receive a stereotype plate therein, means connected with said drive shaft for rotating said drum, a hand-lever adapted to throw said drum-rotating mechanism into operation with said drive shaft, plate finishing mechanism adapted by the rotation of said drum to finish said plate, means operated by the rotation of said drum to lock said plate in said drum, forwarding rollers carried by said drum and adapted to engage the side edges of the plate and by rotation to move the same longitudinally of the drum, mechanism for normally driving said rollers from said drive shaft, means connected with said roller-driving mechanism and adapted by the moving of said plate into position in said drum to disconnect said roller-driving mechanism from said rollers, mechanism operated by the rotation of said drum to disconnect said drum-driving mechanism upon the completion of the rotation of said drum, and means operated by the rotation of said drum to again throw said roller-driving mechanism into operative relation with said rollers just at the completion of the rotation of said drum.

17. The combination of a drive shaft, an open-ended drum adapted to receive a stereotype plate therein, means connected with said drive shaft for rotating said drum, a hand-lever adapted to throw said drum-rotating mechanism into operation with said drive shaft, plate finishing mechanism adapted by the rotation of said drum to finish said plate, means operated by the rotation of said drum to lock said plate in said drum and subsequent to the finishing of said plate to release the same, forwarding rollers carried by said drum and adapted to engage the side edges of the plate and by rotation to move the same longitudinally of the drum, mechanism for normally driving said rollers from said drive shaft, means connected with said roller-driving mechanism and adapted by the moving of said plate into position in said drum to disconnect said roller-driving mechanism from said rollers, mechanism operated by the rotation of said drum to disconnect said drum-driving mechanism upon the completion of the rotation of said drum, and means operated by the rotation of said drum to again throw said roller-driving mechanism into operative relation with said rollers just at the completion of the rotation of said drum.

18. In combination, a rotatable support adapted to receive a stereotype plate therein, mechanism adapted to rotate said support, plate finishing mechanism adapted by the rotation of said support to finish said plate, positively-driven means for forwarding said plate into said support, means for automatically stopping the operation of said plate-forwarding means during the rotation of said support, and means for automatically stopping the rotation of said support after said plate is finished.

19. In combination, a rotatable support adapted to receive a stereotype plate therein, mechanism adapted to rotate said support, plate finishing mechanism adapted by the rotation of said support to finish said plate, positively-driven means for forwarding said plate into said support, and means actuated by the forward movement of said plate to throw out of operation said plate-forwarding means.

20. In combination, a rotatable support adapted to receive a stereotype plate therein, mechanism adapted to rotate said support, plate-finishing mechanism adapted by the rotation of said support to finish said plate, positively-driven means for forwarding said plate into said support, means actuated by the forward movement of said plate to throw out of operation said plate-forwarding mechanism before the commencement of the rotation of said support, and other means coöperating therewith adapted to again throw said plate-forwarding mechanism into operation after said plate is finished to forward said plate out of said support.

21. In combination, a rotatable support adapted to receive a stereotype plate therein, means for forwarding said plate into said support, a spring-actuated arm adapted to be engaged by the forward end of said plate and adapted to be displaced by the forward movement of the plate, means connected with said arm actuated by its forward movement to throw out of operation said plate-forwarding mechanism before the commencement of the rotation of said support, plate-finishing mechanism adapted by the rotation of said support to finish said plate, and means for rotating said support whereby said plate is finished and said arm is freed from engagement with the forward end of said plate.

22. In combination, a rotatable support adapted to receive a stereotype plate therein, means for forwarding said plate into said support, an arm spring-actuated and adapted to be swung angularly or to be moved longitudinally of said support and adapted to be engaged by the forward end of said plate and to be displaced thereby, means connected with said arm actuated by its forward movement to throw out of operation said plate-forwarding mechanism before the commencement of the rotation of said support, plate-finishing mechanism adapted by the rotation of said support to finish said plate, and means for rotating said support whereby said plate is finished and said arm is freed from engagement with the forward end of said plate and returned to normal position by the said spring, said arm being thereafter engaged by the edge of the plate as the support continues to rotate and swung against the action of said spring.

23. In combination, a rotatable support adapted to receive a stereotype plate therein, means for forwarding said plate into said support, an arm spring-actuated and adapted to be swung angularly or to be moved longitudinally of said support and adapted to be engaged by the forward end of said plate and to be displaced thereby, means connected with said arm actuated by its forward movement to throw out of operation said plate-forwarding mechanism before the commencement of the rotation of said support, plate-finishing mechanism adapted by the rotation of said support to finish said plate, means for rotating said support whereby said plate is finished and said arm is freed from engagement with the forward end of said plate and returned to normal position by the said spring, said arm being thereafter engaged by the edge of the plate as said support rotates and swung against the action of said spring, and additional means adapted to again throw into operation said plate-forwarding mechanism whereby said finished plate is forwarded out of said support.

24. In combination, a rotatable support adapted to receive a stereotype plate therein, means for forwarding said plate into said support, a rotatably-mounted slide-rod extending into said support, a coiled spring mounted on said rod and adapted to normally hold it against both longitudinal and radial movement, an arm on the inner end of said slide-rod in the path of said plate as it is forwarded into said support, means operated by the longitudinal movement of said slide-rod as it is actuated by the contact of the plate with said arm to throw out of operation said plate-forwarding mechanism, plate-finishing mechanism adapted by the rotation of said support to finish said plate, and means for rotating said support, said arm being free to move angularly against the action of said spring when the edge of the plate comes in contact therewith.

25. In combination, a rotatable support adapted to receive a stereotype plate therein, mechanism adapted to rotate said support, plate-finishing mechanism adapted by the rotation of said support to finish said plate, means for forwarding said plate into said support, and spring-actuated means released by the forward movement of said plate and adapted by the force of said spring to throw out of operation said plate-forwarding mechanism.

26. In combination, a rotatable support adapted to receive a stereotype plate therein, mechanism adapted to rotate said support, plate-finishing mechanism adapted by the rotation of said support to finish said plate, means for forwarding said plate into said support, a spring-actuated device adapted by the force of the spring to throw out of operation said plate-forwarding mechanism, a latch adapted to hold said device against the action of said spring, and means actuated by the forward movement of said plate at a predetermined point to release said latch.

27. In combination, a rotatable support adapted to receive a stereotype plate therein, mechanism adapted to rotate said support, plate-finishing mechanism adapted by the rotation of said support to finish said plate, means for forwarding said plate into said support, a spring-actuated device adapted by the force of the spring to throw out of operation said plate-forwarding mechanism, a latch adapted to hold said device against the action of said spring, an arm moved by the forward movement of said plate, and link and lever connections between said arm and said latch whereby the forward movement of said arm serves to release said latch.

28. In combination, a rotatable support adapted to receive a stereotype plate therein, a drive shaft, mechanism adapted to rotate said support, plate-finishing mechanism adapted by the rotation of said support to finish said plate, means carried by said support adapted to forward said plate into position therein, and mechanism adapted to be driven by said drive shaft for operating said plate-forwarding means at predetermined intervals.

29. In combination, a rotatable support adapted to receive a stereotype plate therein, a drive shaft, mechanism adapted to rotate said support, plate-finishing mechanism adapted by the rotation of said support to finish said plate, rollers adapted by their rotation to forward said plate into position in said support, and angularly-movable shafts adapted to be driven continuously by said drive shaft and adapted to be swung into or out of operative engagement with said rollers when said support is at rest.

30. In combination, a rotatable support adapted to receive a stereotype plate therein, a drive shaft, mechanism adapted to rotate said support, plate-finishing mechanism adapted by the rotation of said support to finish said plate, rollers carried by said support adapted by their rotation to forward said plate into position therein, worm gears carried by said support and rotatable with said rollers, angularly-movable shafts adapted to be driven continuously by said drive shafts, worms mounted upon the ends of said angularly-movable shafts, and means for swinging said shafts to bring said worms into or out of engagement with their respective worm-gears when said support is at rest.

31. In combination, a rotatable support adapted to receive a stereotype plate therein, a drive shaft, mechanism adapted to rotate said support, plate-finishing mechanism adapted by the rotation of said support to finish said plate, means carried by said support adapted to forward said plate into position therein, angularly-movable sleeves, shafts journaled in said sleeves, gearing on said shafts adapted to transmit motion from said drive shaft to said plate-forwarding means, and means for swinging said sleeves to bring the gearing on the ends of said shafts into or out of engagement with the plate-forwarding means.

32. In combination, a rotatable support adapted to receive a stereotype plate therein, a drive shaft, mechanism adapted to rotate said support, plate-finishing mechanism adapted by the rotation of said support to finish said plate, means carried by said support adapted to forward said plate into position therein, sleeves pivotally-mounted adjacent to said drive shaft and adapted to be swung angularly, shafts journaled in said sleeves adapted to be driven continuously by said drive shaft and adapted to drive said plate-forwarding means when said sleeves are swung in one direction, pins on said sleeves, and levers provided with obliquely-disposed slots engaging said pins whereby by the rocking of said levers said sleeves are swung in one direction or the other to throw into or out of operation said plate-forwarding means.

33. In combination, a rotatable support adapted to receive a stereotype plate therein, a drive shaft, means for rotating the same, mechanism adapted to rotate said support, plate-finishing mechanism adapted by the rotation of said support to finish said plate, means carried by said support adapted to forward said plate into position therein, mechanism adapted to be driven by said drive shaft for operating said plate-forwarding means and adapted to be thrown into and out of operation, and a spring-actuated slide-rod connected with said last-named mechanism and adapted by the force of the spring to be moved to throw said mechanism out of operation.

34. In combination, a rotatable support adapted to receive a stereotype plate therein, a drive shaft, means for rotating the same, mechanism adapted to rotate said support, plate-finishing mechanism adapted by the rotation of said support to finish said plate, means carried by said support adapted to forward said plate into position therein, angularly-movable shafts adapted to be driven continuously by said drive shaft and adapted to be swung into or out of operative engagement with said plate-forwarding mechanism, and a spring-actuated slide-rod adapted by the force of the spring to be moved to throw said shafts out of engagement with said plate-forwarding mechanism.

35. In combination, a rotatable support adapted to receive a stereotype plate therein, a drive shaft, mechanism adapted to rotate said support, plate-finishing mechanism adapted by the rotation of said support to finish said plate, means carried by said support adapted to forward said plate into position therein, sleeves pivotally-mounted adjacent to said drive shaft and adapted to be swung angularly, shafts journaled in said sleeves adapted to be driven continuously by said drive shaft and adapted to drive said plate-forwarding means when said sleeves are swung in one direction, pins on said sleeves, levers provided with obliquely-disposed slots engaging said pins whereby by the rocking of said levers said sleeves are swung to throw into or out of operation said plate-forwarding means, a spring-actuated slide-rod, and connections between said slide-rod and said levers whereby the free action of said spring throws out of operation said plate-forwarding means.

36. In combination, a rotatable support adapted to receive a stereotype plate therein, a drive shaft, mechanism adapted to rotate said support, plate-finishing mechanism adapted by the rotation of said support to finish said plate, means adapted to forward said plate into position in said support, a spring operatively connected with said plate-forwarding means and adapted to throw the same out of operation, a lever, a latch thereon adapted when said lever is at one limit of its motion to hold said plate-forwarding means in operation against the action of said spring, and a second spring stronger than said first-mentioned spring connected with said lever and tending to move said lever and through the medium of said latch tending also to throw said plate-forwarding means into operation against the action of said first-mentioned spring.

37. In combination, a rotatable support adapted to receive a stereotype plate therein, a drive shaft, mechanism adapted to rotate said support, plate-finishing mechanism adapted by the rotation of said support to finish said plate, means driven by said shaft adapted to forward said plate into position in said support, a spring operatively connected with said plate-forwarding means and adapted to throw the same out of operation, a lever, a latch thereon adapted when said lever is at one limit of its motion to hold said plate-forwarding means in operation against the action of said spring, a second spring stronger than said first-mentioned spring connected with said lever and tending to move said lever and through the medium of said latch tending also to throw said plate-forwarding means into operation against the action of said first-mentioned spring, and a stop adapted automatically to hold said lever when moved against the action of said second spring to prevent said plate-forwarding means being thrown into operation.

38. In combination, a rotatable support adapted to receive a stereotype plate therein, a drive shaft, mechanism adapted to rotate said support, plate-finishing mechanism adapted by the rotation of said support to finish said plate, means driven by said shaft adapted to forward said plate into position in said support, a spring operatively connected with said plate-forwarding means and adapted to throw the same out of operation, a lever, a latch thereon adapted when said lever is at one limit of its motion to hold said plate-forwarding means in operation against the action of said spring, a second spring stronger than said first-mentioned spring connected with said lever and tending to move said lever and through the medium of said latch tending also to throw said plate-forwarding means into operation against the action of said first-mentioned spring, a spring-seated stop adapted to hold said lever against the action of said second spring, and means actuated by the rotation of said support after said plate is finished to release said stop whereby said second spring is free to throw said plate-forwarding means into operation.

39. In combination, a rotatable support adapted to receive a stereotype plate therein, plate-finishing mechanism adapted by the rotation of said support to finish said plate, means adapted to forward said plate into position in said support, a spring operatively connected with said plate-forwarding means and adapted to throw the same out of operation, a lever, means arranged to be brought into action by a movement of said lever in one direction to rotate said support, a latch on said lever adapted when said lever is moved in the opposite direction to throw said plate-forwarding means into operation against the action of said spring, and a second spring stronger than said first-mentioned spring connected with said lever and tending to move said lever and through the medium of said latch tending also to throw said plate-forwarding means into operation against the action of said first-mentioned spring and to throw said support-rotating means out of operation.

40. In combination, a rotatable support adapted to receive a stereotype plate therein, plate-finishing mechanism adapted by the rotation of said support to finish said plate, means adapted to forward said plate into position in said support, a spring operatively connected with said plate-forwarding means and adapted to throw the same out of operation, a lever, means actuated by a movement of said lever in one direction to rotate said support, a latch on said lever adapted when said lever is moved in the opposite direction to throw said plate-forwarding means into operation against the action of said spring, a second spring stronger than said first-mentioned spring connected to said lever and tending to move said lever and through the medium of said latch tending also to throw said plate-forwarding means into operation against the action of said first-mentioned spring, a spring-seated stop adapted to hold said lever against the action of said second spring, and means actuated by the rotation of said support after said plate is finished to release said stop whereby said second spring is free to throw said plate-forwarding means into operation and to throw said support-rotating means out of operation.

41. In combination, a rotatable support adapted to receive a stereotype plate therein, plate-finishing mechanism adapted by the rotation of said support to finish said plate, means adapted to forward said plate into position in said support, a spring operatively connected with said plate-forwarding means and adapted to throw the same out of operation, means adapted automatically to lock said plate firmly in said support at the commencement of the rotation thereof, a lever, means actuated by a movement of said lever in one direction to rotate said support, a latch on said lever adapted when said lever is moved in the opposite direction to throw said plate-forwarding means into operation against the action of said spring, a second spring stronger than said first-mentioned spring connected with said lever and tending to move said lever and through the medium of said latch tending also to throw said plate-forwarding means into operation against the action of said first-mentioned spring, a spring-seated stop adapted to hold said lever against the action of said second spring, means actuated by the rotation of said support after said plate is finished to release said stop whereby said second spring is free to act to throw said plate-forwarding means into operation and to throw said support-rotating means out of operation, and means for automatically releasing said plate from said support at the cessation of the rotation of the support whereby said plate-forwarding means serve to forward the plate out of the machine.

42. In combination, a rotatable support adapted to receive a stereotype plate therein, mechanism adapted to rotate said support, plate-finishing mechanism adapted by the rotation of said support to finish said plate, a drive shaft, means driven from said shaft for forwarding said plate into said support and adapted to be thrown into or out of operation, links operatively connected with said plate-forwarding means, a spring tending to impart a movement to said links whereby said plate-forwarding means are thrown out of operation, a lever, a latch carried by said lever adapted to engage a lug movable with said links to hold said spring out of operation when stressed, and means actuated by the forward movement of the plate into said support for releasing said latch, said latch being adapted to be again engaged by said lug upon a subsequent movement of said lever in the direction of the action of said spring.

43. In combination, a rotatable support adapted to receive a stereotype plate therein, mechanism adapted to rotate said support, plate-finishing mechanism adapted by the rotation of said support to finish said plate, a drive shaft, means driven from said shaft for forwarding said plate into said support and adapted to be thrown into or out of operation, links operatively connected with said plate-forwarding means, a spring tending to impart a movement to said links whereby said plate-forwarding means are thrown out of operation, a lever, a latch carried by said lever adapted to engage a lug movable with said links to hold said spring out of operation when stressed, means actuated by the forward movement of the plate into said support for releasing said latch and permitting said spring to throw out of operation said plate-forwarding means, said latch being adapted to be again engaged by said lug upon a subsequent movement of said lever in the direction of the action of said spring, and a second spring stronger than said first-mentioned spring connected with said lever and adapted to move said lever and through the medium of said lug and latch adapted to move also said links against the action of said first-mentioned spring whereby said plate-forwarding means are again thrown into operation.

44. In combination, a rotatable support adapted to receive a stereotype plate therein, mechanism adapted to rotate said support, plate-finishing mechanism adapted by the rotation of said support to finish said plate, a drive shaft, means driven from said shaft for forwarding said plate into said support and adapted to be thrown into or out of operation, links operatively connected with said plate-forwarding means, a spring tending to impart a movement to said links whereby said plate-forwarding means are thrown out of operation, a lever, a latch carried by said lever adapted to engage a lug movable with said links to hold said spring out of operation when stressed, means actuated by the forward movement of the plate into said support for releasing said latch and permitting said spring to throw out of operation said plate-forwarding means, said latch being adapted to be again engaged by said lug upon a subsequent movement of said lever in the direction of the action of said spring, a second spring stronger than said first-mentioned spring connected with said lever and adapted to move said lever and through the medium of said lug and latch adapted to move also said links against the action of said first-mentioned spring, a stop adapted to hold said lever against the action of said second spring, and means actuated by the rotation of said support to release said stop after said plate is finished, permitting said second spring to again throw into operation said plate-forwarding means.

45. In combination, a rotatable support adapted to receive a stereotype plate therein, mechanism adapted to rotate said support, plate-finishing mechanism adapted by the rotation of said support to finish said plate, means for forwarding said plate into said support, means for throwing out of operation said plate-forwarding mechanism, and spring-actuated means adapted by the force of the spring to stop the actuation of said support and to throw into operation said plate-forwarding mechanism.

46. The combination of a finishing cylinder having two supports within the same, one of which is movable, for holding a stereotype in said cylinder, means for rotating the cylinder, and means operated by the rotation of the cylinder for causing a positive movement of said movable support whereby said stereotype is supported rigidly within said cylinder against movement in either direction circumferentially thereof.

47. The combination of a finishing cylinder having two supports within the same, both of which are movable, for holding a stereotype in said cylinder, means for rotating the cylinder, and means operated by the rotation of the cylinder for causing a positive movement of said movable supports simultaneously to clamp said stereotype rigidly in said cylinder.

48. The combination of a finishing cylinder having two supports within the same, both of which are movable, for holding a stereotype in said cylinder, means for rotating the cylinder, and means operated by the rotation of the cylinder for causing a positive movement of said movable supports simultaneously to clamp said stereotype in said cylinder during substantially a complete rotation and adapted at the end of a complete rotation to permit said stereotype to drop down out of close contact with said cylinder.

49. The combination of a finishing cylinder having two supports within the same, one of which is movable, for clamping a stereotype in said cylinder, means for rotating the cylinder, a lever fulcrumed on said cylinder adapted to engage said movable support and hold it in clamping position, and a ring cam adapted during a portion of the rotation of said cylinder to hold said lever positively in clamping position.

50. The combination of a finishing cylinder having two supports within the same, one of which is movable, for clamping a stereotype plate in said cylinder, a rock-shaft journaled in said cylinder, two arms mounted on said rock-shaft each at its end engaging said movable support, a third arm mounted on said rock-shaft, a roller mounted on said third arm, and a ring cam adapted during a portion of the rotation of said cylinder to engage said roller and to hold said rock-shaft in turned position whereby said movable support is held in plate-clamping position.

51. The combination of a finishing cylinder having two supports within the same both of which are movable, for clamping a stereotype plate in said cylinder, means for rotating the cylinder, two levers fulcrumed on said cylinder each adapted to engage one of said movable supports and hold it in clamping position, and two ring cams adapted during a portion of the rotation of said cylinder to engage said levers and hold them positively in clamping position.

52. In combination, a rotatable support adapted to receive a stereotype plate therein, mechanism adapted to rotate said support, plate-finishing mechanism adapted by the rotation of said support to finish said plate, rollers adapted by their rotation to forward a plate into position therein, means for normally driving said rollers, mechanism operated by the forward movement of said plate in said support to stop said roller-rotating mechanism during the rotation of said support, means for automatically locking said plate in said support at the commencement of its rotation, means for automatically stopping the rotation of said support after said plate is finished, and mechanism automatically operated to again rotate said forwarding rollers.

53. In combination, a rotatable support adapted to receive a stereotype plate therein, mechanism adapted to rotate said support, plate-finishing mechanism adapted by the rotation of said support to finish said plate, rollers adapted by their rotation to forward a plate into position therein, means for normally driving said rollers, mechanism operated by the forward movement of said plate in said support to stop said roller-rotating mechanism during the rotation of said support, means for automatically locking said plate in said support at the commencement of its rotation and for automatically releasing the same at the cessation of the rotation, means for automatically stopping the rotation of said support after said plate is finished, and mechanism automatically operated to again rotate said forwarding rollers.

54. In combination, a rotatable support adapted to receive a stereotype plate therein, mechanism adapted to rotate said support, plate-finishing mechanism adapted by the rotation of said support to finish said plate, rollers adapted by their rotation to forward a plate into position therein, means for normally driving said rollers, mechanism operated by the forward movement of said plate in said support to stop said roller-rotating mechanism before the commencement of the rotation of said support, a hand-lever adapted for throwing said support-rotating mechanism into operation, means for automatically stopping the rotation of said support after said plate is finished, and mechanism automatically operated to again rotate said forwarding rollers.

55. The combination with a rotary support adapted to receive a stereotype plate therein, means for rotating the same, and a tail-cutter adapted to be brought into engagement with said plate by the rotation of said support and to cut the tail therefrom, of a tail-support adapted to receive the tail of said plate when severed from the plate, means operated by the weight of said severed tail upon said tail-support to rock the same and discharge the tail, and means adapted to automatically restore said tail-support to normal position when freed of the weight of said tail.

56. The combination with a rotary support adapted to receive a stereotype plate therein, means for rotating the same, and a tail-cutter adapted to be brought into engagement with said plate by the rotation of said support to cut the tail therefrom, of a swinging tail-support adapted to receive the tail when severed from the plate, means for normally locking said tail-support in receiving position, mechanism operated by the rotation of said plate-support to unlock said locking mechanism when the tail is severed, and means for automatically restoring said tail-support to normal position and locking the same when freed of the weight of said tail.

57. The combination with a rotary support adapted to receive a stereotype plate therein, means for rotating the same, and a tail-cutter adapted to be brought into engagement with said plate by the rotation of said support and to cut the tail therefrom, of a pivotally-mounted tail-support adapted to receive the tail of said plate when severed from the plate, a hook operatively connected with said tail-support, means adapted to engage said hook to hold said tail-support in normal position and adapted to be automatically disengaged by the rotation of said rotary support after said tail is severed, and means for automatically restoring said tail-support to normal position with said hook again in engagement when said tail-support is freed of said tail.

58. The combination with a rotary support adapted to receive a stereotype plate therein, means for rotating the same, and a tail-cutter adapted to be brought into engagement with said plate by the rotation of said support and to cut the tail therefrom, of a pivotally-mounted tail-support adapted to receive the tail of said plate when severed from the plate, a hook operatively connected with said tail-support, a rock-shaft, an arm mounted thereon adapted to engage said hook and to hold said tail-support in normal position, means actuated by the rotation of said rotary support after said tail is severed adapted to rock said rock-shaft to free said arm from said hook whereby said tail-support is depressed permitting said tail to slide therefrom, and means for automatically restoring said tail-support to normal position with said hook again in engagement with said arm.

59. The combination with a rotary support adapted to receive a stereotype plate therein, means for rotating the same, and a tail-cutter adapted to be brought into engagement with said plate by the rotation of said support and to cut the tail therefrom, of a pivotally-mounted tail-support adapted to receive the tail of said support when severed from the plate, a hook operatively connected with said tail-support, a spring-actuated rock-shaft, an arm mounted thereon adapted to engage said hook and to hold said tail-support in normal receiving position, means actuated by the rotation of said rotary support after said tail is severed adapted to rock said rock-shaft against the action of said spring to free said arm from said hook whereby said tail-support is depressed permitting said tail to slide therefrom, and means for automatically restoring said tail-support to normal receiving position with said hook again in engagement with said arm.

60. The combination with a rotary support adapted to receive a stereotype plate therein, means for rotating the same, a tail-cutter adapted to be brought into engagement with said plate by the rotation of said support and to cut the tail therefrom, a rock-shaft, an arm mounted thereon, a tail-support adapted to receive the tail of said plate when severed from the plate pivotally mounted on said arm, a link pivoted on said tail-support above the pivotal point of said tail-support on said arm, said link being provided with a slot, and a lug on said arm above the pivotal point of said tail-support on said arm adapted to be engaged by said slot, of means for normally locking said tail-support in receiving position, mechanism operated by the rotation of said plate support to release said locking mechanism after the tail is severed, permitting said tail-support to be depressed and permitting said tail to slide from said support, and means for automatically restoring said tail-support to normal receiving position and locking the same in position when freed of the weight of said tail-piece.

61. In a plate finishing machine, the combination with automatically-operated mechanism for feeding a plate into the machine, and mechanism for finishing said plate, of means for feeding a cooling fluid into said machine while said plate is being trimmed and shaved.

62. In a plate finishing machine, the combination with automatically-operated mechanism for feeding a plate into the machine, and mechanism for finishing said plate, of means for feeding a cooling fluid into said machine while said plate is being trimmed and shaved, and mechanism adapted to automatically eject said plate after the same is finished and cooled.

63. In a machine of the character described, the combination of a rotary plate cylinder, rock shafts supported by and rotatable with said cylinder, levers fixed to said rock shafts and projecting through walls of the cylinder, and means whereby when the cylinder is started said arms will be moved simultaneously to cause the printing plate supported thereby to be brought into close contact with the cylinder.

64. In a machine of the character described, the combination of a rotary plate cylinder, longitudinal rock shafts supported thereby and having levers thereon and projecting beyond the walls of the cylinder, means carried by the said lever for supporting the printing plates, and means whereby when the cylinder is started said levers will be moved to bring the printing plate supported thereby into contact with the cylinder.

65. In a machine of the character described, the combination of a support for a printing plate, movable means on the support for receiving the edges of a printing plate, a stop for limiting the position of the plate on the support, means whereby the stop is withdrawn after the plate is clamped in position and kept out of the way until the plate is discharged, and a cutter for operating on the plate.

66. In a mechanism for finishing printing plates, the combination of means for feeding a cooling fluid upon a plate, and means for holding said plate rigidly in position for preventing warping while the cooling fluid is being applied thereto.

67. In a machine for finishing a curved printing plate, the combination of a support having a curvature corresponding to that of the plate, means for clamping a plate firmly in position upon said support, and means for feeding a cooling fluid upon said plate while so clamped in position.

68. In a machine for finishing a curved printing plate, the combination of a support having a curvature corresponding to that of the plate, means for clamping a plate rigidly in position upon said support, and means for spraying water upon said plate for cooling the plate while so clamped in position.

69. The combination of an arched member, means for clamping a printing plate into contact with the inner face of said arched member, and means for feeding a cooling fluid upon said plate while clamped in position in said arched member.

70. In a mechanism for finishing printing plates, the combination of an arched member having a curvature coresponding to that of the plate, means movable circumferentially of the arched member for clamping a plate firmly into contact with the curved inner face of said arched member, and means for feeding a cooling fluid upon said plate while so clamped in position.

71. In a mechanism for finishing printing plates, the combination of a drum having a curved inner face, means for clamping a printing plate firmly into contact with the inner face of said drum and means for feeding a cooling fluid upon said plate while so clamped in position.

72. In a mechanism for finishing printing plates, the combination of a drum having a curved inner face, means carried by the drum and movable circumferentially thereof adapted to engage the side edges of a printing plate for clamping the plate firmly into contact with the inner face of the drum, and means for feeding a cooling fluid upon said plate while so clamped in position.

SAMUEL G. GOSS.

Witnesses:
C. E. PICKARD,
W. H. DE BUSK.

Copies of this patent may be obtained for five cents each, by addressing the "Commissioner of Patents, Washington, D. C."